United States Patent
Yoshiasa

(10) Patent No.: US 7,203,766 B2
(45) Date of Patent: Apr. 10, 2007

(54) GATEWAY SERVER IN WHICH PICTURE CONTENTS CAN BE DISPLAYED IN SMALL TERMINAL, AND PROCESSING SPEED IS FAST, AND MANUFACTURING COST IS CHEAP, AND METHOD OF OBTAINING CONTENTS

(75) Inventor: Masahiro Yoshiasa, Kanagawa (JP)

(73) Assignee: NEC Corporation, Tokyo (JP)

( * ) Notice: Subject to any disclaimer, the term of this patent is extended or adjusted under 35 U.S.C. 154(b) by 469 days.

(21) Appl. No.: 09/750,046

(22) Filed: Dec. 29, 2000

(65) Prior Publication Data

US 2001/0007998 A1    Jul. 12, 2001

(30) Foreign Application Priority Data

Jan. 11, 2000    (JP)    ............................. 2000/002511

(51) Int. Cl.
*G06F 15/16*    (2006.01)
*G06K 9/32*    (2006.01)

(52) U.S. Cl. ...................... 709/246; 709/217; 709/226; 382/232

(58) Field of Classification Search ................ 709/201, 709/202, 203, 206, 230–236, 220–225, 217–219, 709/246, 226, 247; 345/660; 348/581; 382/174, 382/232, 235, 276, 298; 455/566
See application file for complete search history.

(56) References Cited

U.S. PATENT DOCUMENTS

| | | | | |
|---|---|---|---|---|
| 5,159,668 A * | 10/1992 | Kaasila | ........................ | 345/469 |
| 5,214,519 A * | 5/1993 | Faulhaber et al. | .......... | 358/451 |
| 5,613,017 A * | 3/1997 | Rao et al. | .................... | 382/174 |
| 5,721,565 A * | 2/1998 | Nguyen | ...................... | 345/660 |
| 5,838,905 A * | 11/1998 | Leigh | .......................... | 709/201 |
| 5,959,691 A * | 9/1999 | Koh | ........................... | 348/581 |
| 6,009,471 A * | 12/1999 | Harumoto et al. | .......... | 709/231 |
| 6,094,230 A * | 7/2000 | Han | ............................. | 348/564 |
| 6,108,554 A * | 8/2000 | Kawamoto | ............... | 455/456.5 |
| 6,247,050 B1 * | 6/2001 | Tso et al. | ................... | 709/224 |
| 6,421,733 B1 * | 7/2002 | Tso et al. | ................... | 709/246 |
| 6,684,087 B1 * | 1/2004 | Yu et al. | ..................... | 455/566 |
| 6,973,619 B1 * | 12/2005 | Hirose et al. | ............... | 715/530 |

FOREIGN PATENT DOCUMENTS

| | | |
|---|---|---|
| EP | 0 969 389 A2 | 1/2000 |
| EP | 0969389 A2 * | 1/2000 |
| JP | 10-21165 | 1/1998 |
| JP | 10-149309 | 6/1998 |
| JP | 10-162002 | 6/1998 |
| JP | 11-149448 | 6/1999 |
| JP | 11-175425 | 7/1999 |
| JP | 11-250009 | 9/1999 |

* cited by examiner

*Primary Examiner*—Saleh Najjar
*Assistant Examiner*—V. Korobov
(74) *Attorney, Agent, or Firm*—Foley & Lardner LLP

(57) ABSTRACT

A gateway server includes a convert section and an output section. The convert section converts a first contents into a second contents. The first contents is received from a contents server in response to a request of a small terminal. The second contents corresponds to a display performance of a display section of the small terminal. The output section outputs the second contents to the small terminal.

11 Claims, 5 Drawing Sheets

GATEWAY SERVER IN WHICH PICTURE CONTENTS CAN BE DISPLAYED IN SMALL TERMINAL, AND PROCESSING SPEED IS FAST, AND MANUFACTURING COST IS CHEAP, AND METHOD OF OBTAINING CONTENTS

BACKGROUND OF THE INVENTION

1. Field of the Invention

The present invention relates to a gateway server and a method of obtaining a contents. More particularly, the present invention relates to a gateway server for arbitrating a communication between a small terminal and a contents server, and a method of obtaining a contents.

2. Description of the Related Art

As shown in FIG. 1, small terminals 1-1 to 1-4 are connected through a network infrastructure 4 to a gateway server 2. The gateway server 2 is also connected through the network infrastructure 4 to contents servers 3-1 to 3-4.

The small terminals 1-1 to 1-4, when receiving a request of a contents retrieval from a user, requests the gateway server 2 to retrieve the contents, and displays the contents retrieved through the I/O device 2 from the contents servers 3-1 to 3-4.

The gateway server 2 is the device for carrying out an arbitration between the small terminals 1-1 to 1-4 and the contents servers 3-1 to 3-4. It accepts a request of a contents retrieval from the small terminals 1-1 to 1-4. It checks whether the contents requested from the small terminals 1-1 to 1-4 is present on a LAN or present on an Internet 5. If the contents is present on the LAN, it requests the contents servers 3-1 to 3-4 on the LAN to retrieve the contents requested from the small terminals 1-1 to 1-4. If the contents is present on the Internet 5, it requests the contents servers 3-1 to 3-2 on the Internet 5 to retrieve the contents requested from the small terminals 1-1 to 1-4. If the gateway server 2 succeeds in retrieving the contents requested through the small terminals 1-1 to 1-4 from the contents servers 3-1 to 3-4, distributes the retrieved contents to the small terminals 1-1 to 1-4.

The contents servers 3-1 to 3-4 are the devices for storing therein the contents and distributing the requested contents. They search for the contents requested from the gateway server 2 through the contents servers 3-1 to 3-4. If they can search for the contents, the contents servers 3-1 to 3-4 retrieve the searched contents, and distribute to the gateway server 2 of the request source. If the contents can not be searched, the contents servers 3-1 to 3-4 distribute an error message indicative of an absence of the contents to the gateway server 2 of the request source.

The network infrastructure 4 is the communication network to which the small terminal 1, the gateway server 2 and the contents server 3 are connected. The distributed contents on which the request of the contents retrieval is performed flows through the communication network.

The gateway server 2 simply relays the request of the contents retrieval from the small terminals 1-1 to 1-4 and the contents to the contents servers 3-1 to 3-4 and the small terminals 1-1 to 1-4. Thus, there may be a case that the requested contents is a picture contents, and thereby the display performance of the small terminals 1-1 to 1-4 is not sufficient, and accordingly the retrieved picture contents is not correctly displayed on the small terminals 1-1 to 1-4. In order to display the picture contents on the small terminals 1-1 to 1-4, a generator of the contents must generate two kinds of picture contents for a typical terminal and a small terminal.

A known server apparatus noted in Japanese Laid Open Patent Application (JP-A-Heisei, 11-250009) receives a release information of a terminal together with a request of a contents retrieval of the terminal, and performs a data conversion on the retrieved contents so as to match with the terminal, in accordance with the release information. Also, the server apparatus stores therein a database of a release information correlated with an ID of the terminal, and receives the ID of the terminal together with the request of the contents retrieval of the terminal, and captures the release information corresponding to the ID from the database, and then performs the data conversion on the retrieved contents so as to match with the terminal. Such a server apparatus must change a method of converting a data, in accordance with the release information. Thus, its process is complex, and its processing speed is slow. Moreover, such a server apparatus requires a memory for storing therein the database. Hence, its manufacturing cost is further expensive.

Japanese Laid Open Patent Application (JP-A-Heisei, 10-149309) discloses a digital picture information accumulation system as described below. Installation terminals are installed at a plurality of locations at streets. A digital picture information obtained by the portable terminal during a movement is transferred at a high speed to the installation terminal at any position, and transiently accumulated in it. Then, an attribute information of the accumulated stored digital picture information is generated and transferred to a digital information server connected through a first network, and unitarily managed. This digital information server connects an installation terminal accumulating therein a digital picture information of a concerned person, to a computer of the concerned person of a house or an office accessing through a second network, and then transfers its digital picture information to the computer.

Japanese Laid Open Patent Application (JP-A-Heisei, 10-162002) discloses an Internet browsing apparatus. The visibility and the operational performance can be improved by mounting: a picture data expander for expanding a reception picture data, generating a picture data and obtaining a picture size; a screen size setter for setting a size of a display screen size; and a display position modifier for calculating display positions of a character and a picture from a reception character data and the picture size and modifying the display positions so as to satisfy a lateral size of the display screen.

SUMMARY OF THE INVENTION

The present invention is accomplished in view of the above mentioned problems. Therefore, an object of the present invention is to provide a gateway server in which a picture contents can be displayed in a small terminal, and a processing speed is fast, and a manufacturing cost is cheap.

In order to achieve an aspect of the present invention, a gateway server, includes: a convert section converting a first contents into a second contents, wherein the first contents is received from a contents server in response to a request of a small terminal and the second contents corresponds to a display performance of a display section of the small terminal; and an output section outputting the second contents to the small terminal.

In this case, the small terminal is one of a portable wireless telephone, a PHS terminal and a personal digital assistant.

Also in this case, the second contents can be displayed in the display section.

Further in this case, the convert section judges whether the first contents is a picture contents, and when the first contents is not the picture contents, the convert section does not convert the first contents into the second contents.

In this case, the convert section does not convert the first contents into the second contents, when the first contents is received from the contents server in response to a request of a non-small terminal other than the small terminal, and wherein the output section outputs the first contents to the non-small terminal.

Also in this case, the display performance corresponds to the number of display pixels of the display section.

Further in this case, the display performance corresponds to the number of display colors of the display section.

In order to achieve another aspect of the present invention, a contents obtaining system, includes: a terminal having a display section to display a contents; a contents server storing a contents; and a gateway server arbitrating a communication between the terminal and the contents server, and wherein the terminal outputs a first request of obtaining a needed contents to the gateways server, and wherein the gateway server outputs a second request of obtaining the needed contents to the contents server in response to the first request, and wherein the contents server outputs the needed contents to the gateway server in response to the second request, and wherein the gateway server converts the needed contents into a specific contents, wherein the specific contents corresponds to a display performance of the display section of the terminal, and wherein the gateway server outputs the specific contents to the terminal.

In this case, the gateway server judges whether the needed contents is a picture contents, and wherein when the needed contents is not the picture contents, the gateway server does not convert the needed contents into the specific contents and the gateway server outputs the needed contents instead of the specific contents to the terminal.

Also in this case, the terminal is one of a small terminal and a terminal other than the small terminal, and wherein when the terminal is the small terminal, the terminal outputs the first request of obtaining the needed contents to the gateways server, the first request including a information indicating that the terminal is the small terminal, and wherein the gateway server does not convert the needed contents into the specific contents when the gateway server does not receive the information.

In order to achieve still another aspect of the present invention, a contents obtaining method, includes: (a) outputting a first request of obtaining a contents to a gateways server from a terminal; (b) outputting a second request of obtaining the contents to a contents server from the gateway server in response to the first request; (c) outputting the contents to the gateway server from the contents server in response to the second request; (d) converting the contents into a specific contents in the gateway server, wherein the specific contents corresponds to a display performance of a display section of the terminal; and (e) outputting the specific contents to the terminal from the gateway server.

In this case, the contents obtaining method, further includes: (f) judging whether the contents is a picture contents, and wherein when the contents is not the picture contents as the result of the (f), the (d) is not performed and the (e) includes outputting the contents instead of the specific contents to the terminal from the gateway server.

Also in this case, the terminal is one of a small terminal and a terminal other than the small terminal, and wherein when the terminal is the small terminal, the (a) includes outputting the first request of obtaining the contents to the gateways server from the terminal, the first request including a information indicating that the terminal is the small terminal, and wherein the (d) is not performed when the gateway server does not receive the information.

In order to achieve yet still another aspect of the present invention, a computer readable recording medium for recording a program for a process, includes: (a) converting a first contents into a second contents, wherein the first contents is received from a contents server in response to a request of a small terminal and the second contents corresponds to a display performance of a display section of the small terminal; and (b) outputting the second contents to the small terminal.

In this case, the small terminal is one of a portable wireless telephone, a PHS terminal and a personal digital assistant.

Also in this case, the second contents can be displayed in the display section.

Further in this case, the computer readable recording medium for recording a program for a process, further includes: (c) judging whether the first contents is a picture contents; and wherein the (a) is not performed when the first contents is not the picture contents as the result of the (c).

In this case, the (a) is not performed when the first contents is received from the contents server in response to a request of a non-small terminal other than the terminal, and wherein the (b) includes outputting the first contents to the non-small terminal when the (a) is not performed.

Also in this case, the display performance corresponds to the number of display pixels of the display section.

Further in this case, the display performance corresponds to the number of display colors of the display section.

DESCRIPTION OF THE PREFERRED EMBODIMENTS

Preferred embodiments of the present invention will be described referring to the relevant drawings.

An embodiment of a gateway server according to the present invention is the gateway server for mainly arbitrating a communicating between a small terminal and a contents server.

Figure 1:
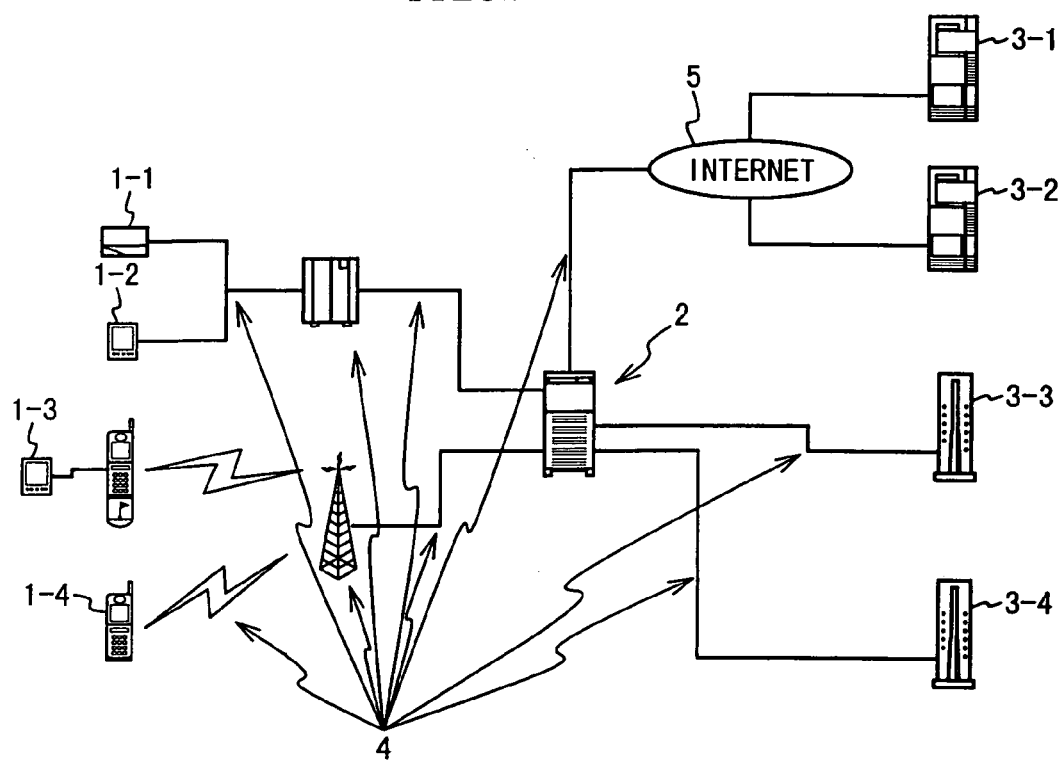
FIG. 1 is a view showing an embodiment of a gateway server according to the present invention.
Figure 2:
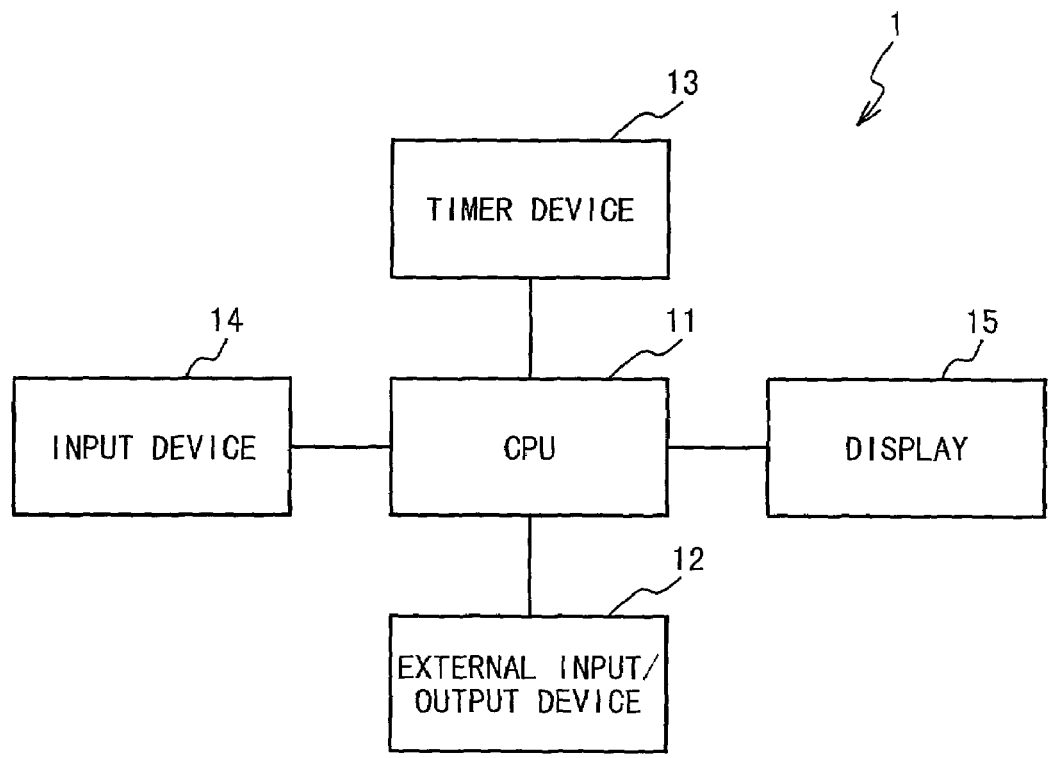
FIG. 2 is a circuit block diagram showing a small terminal in the embodiment of the gateway server according to the present invention.

As shown in FIG. 2, a small terminal 1 is provided with a CPU 11, an external input/output device 12, a timer device 13, an input device 14 and a display 15. The CPU 11 is connected to the external input/output device 12, the timer device 13, the input device 14 and the display 15. The small terminal can be a portable wireless telephone, a PHS terminal, or a personal digital assistant.

The CPU 11 instructs the display 15 to display a request of a contents retrieval accepted from the input device 14, and instructs the external input/output device 12 to transmit the request of the contents retrieval, and then instructs the display 15 to display the retrieved contents.

The external input/output device 12 is an interface portion with a network infrastructure 4. It passes a message or a contents received from a gateway server 2 to the CPU 11, or it transmits the request of the contents retrieval received from the CPU 11 to the gateway server 2, in accordance with the instruction of the CPU 11.

The timer device 13 has a built-in timer to wait for an retrieval of a contents of the CPU 11. A timer is started in accordance with the instruction of the CPU 11. The timer is stopped after a predetermined period from the start. The timer device 13 reports the stop of the timer to the CPU 11. Also, the timer device 13 can stop the timer during the operation, in accordance with the instruction of the CPU 11.

The input device 14 is a portion for receiving a request of a contents retrieval from a user. It passes the received request to the CPU 11. The display 15 is a portion for displaying the contents. It displays the request of the contents retrieval from the user, or a message, in accordance with the instruction of the CPU 11.

Figure 3:
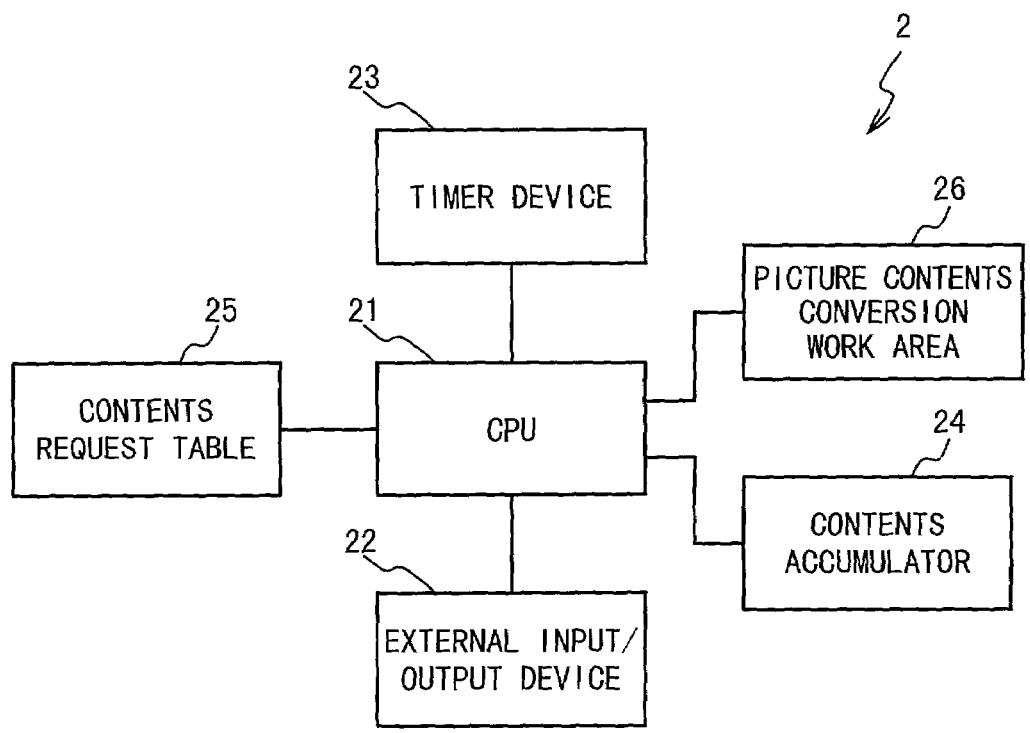
FIG. 3 is a circuit block diagram showing a gateway server in the embodiment of the gateway server according to the present invention.

As shown in FIG. 3, the gateway server 2 is provided with a CPU 21, an external input/output device 22, a timer device 23, a contents accumulator 24, a contents request table 25 and a picture contents conversion work area 26. The CPU 21 is connected to the external input/output device, the timer device 23, the contents accumulator 24, the contents request table 25 and the picture contents conversion work area 26.

The CPU 21 controls the external input/output device 22, the timer device 23, the contents accumulator 24, the contents request table 25 and the picture contents conversion work area 26. Also, the CPU 21 initially has the data with regard to the number of display pixels and the number of display colors of the small terminal 1. Then, it converts a retrieved picture contents into a contents that can be displayed on the small terminal 1 in accordance with the data.

The external input/output device 22 is an interface portion with the network infrastructure 4. It transmits a contents or a message to the small terminal 1, in accordance with the instruction of the CPU 11, or transmits a request of a contents retrieval to the contents server 3. Moreover, it passes the request of the contents retrieval received from the small terminal 1 and the contents received from the contents server 3 to the CPU 21.

The timer device 23 has a built-in timer to wait for an retrieval of a contents of the CPU 21. A timer is started in accordance with the instruction of the CPU 21. The timer is stopped after a predetermined period from the start. The timer device 23 reports the stop of the timer to the CPU 21. Also, the timer device 23 can stop the timer during the operation, in accordance with the instruction of the CPU 21.

The contents accumulator 24 is a portion for storing therein a contents. It stores therein a contents retrieved from the contents server 3, in accordance with the instruction of the CPU 11, 15 passes the stored contents to the CPU 21, and deletes the stored contents.

The contents request table 25 is a portion for storing therein a request of a contents retrieval received from the small terminal 1. It stores therein the request of the contents retrieval received from the small terminal 1, in accordance with the CPU 21, and deletes it.

The picture contents conversion work area 26 is an area for converting a picture contents 25 into a contents satisfying the number of display pixels and the number of display colors of the small terminal 1. It is used by the CPU 21 when the picture contents is converted into the contents satisfying the number of display pixels and the number of display colors of the small terminal 1.

The contents server is a device for storing therein a contents and distributing a requested contents. A contents requested by the gateway server is retrieved from the contents server and distributed to the gateway server.

Figure 4:
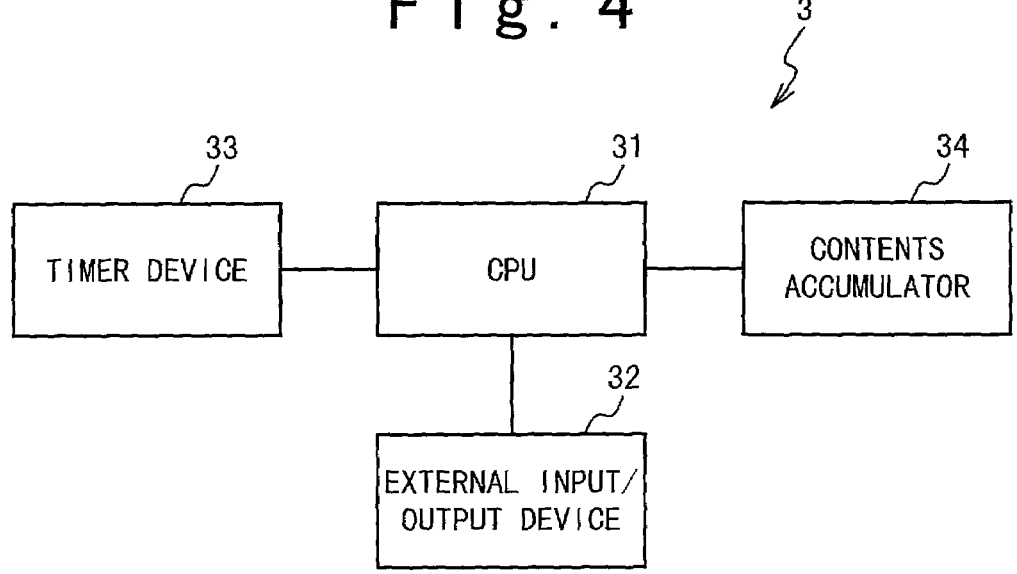
FIG. 4 is a circuit block diagram showing a contents server in the embodiment of the gateway server according to the present invention.

As shown in FIG. 4, the contents server 3 is provided with a CPU 31, an external input/output device 32, a timer device 33 and a contents accumulator 34. The CPU 31 is connected to the external input/output device 32, the timer device 33 and the contents accumulator 34.

The CPU 31 retrieves the contents requested by the gateway server 2 by searching for it through the contents accumulator 34, and then instructs the external input/output device 32 to transmit the retrieved contents.

The external input/output device 32 is an interface portion with the network infrastructure 4. It passes a request of a contents retrieval received from the gateway server 2, or transmits the contents passed by the contents accumulator 34 to the gateway server 2, in accordance with the instruction of the CPU 31.

The timer device 33 has a built-in timer to wait for an retrieval of a contents of the CPU 31. A timer is started in accordance with the instruction of the CPU 31. The timer is stopped after a predetermined period from the start. The timer device 33 reports the stop of the timer to the CPU 31. Also, the timer device 33 can stop the timer during the operation, in accordance with the instruction of the CPU 31.

The contents accumulator 34 is a portion for storing therein a contents. It passes the stored contents to the CPU 31, in accordance with the instruction of the CPU 11.

Figure 5:
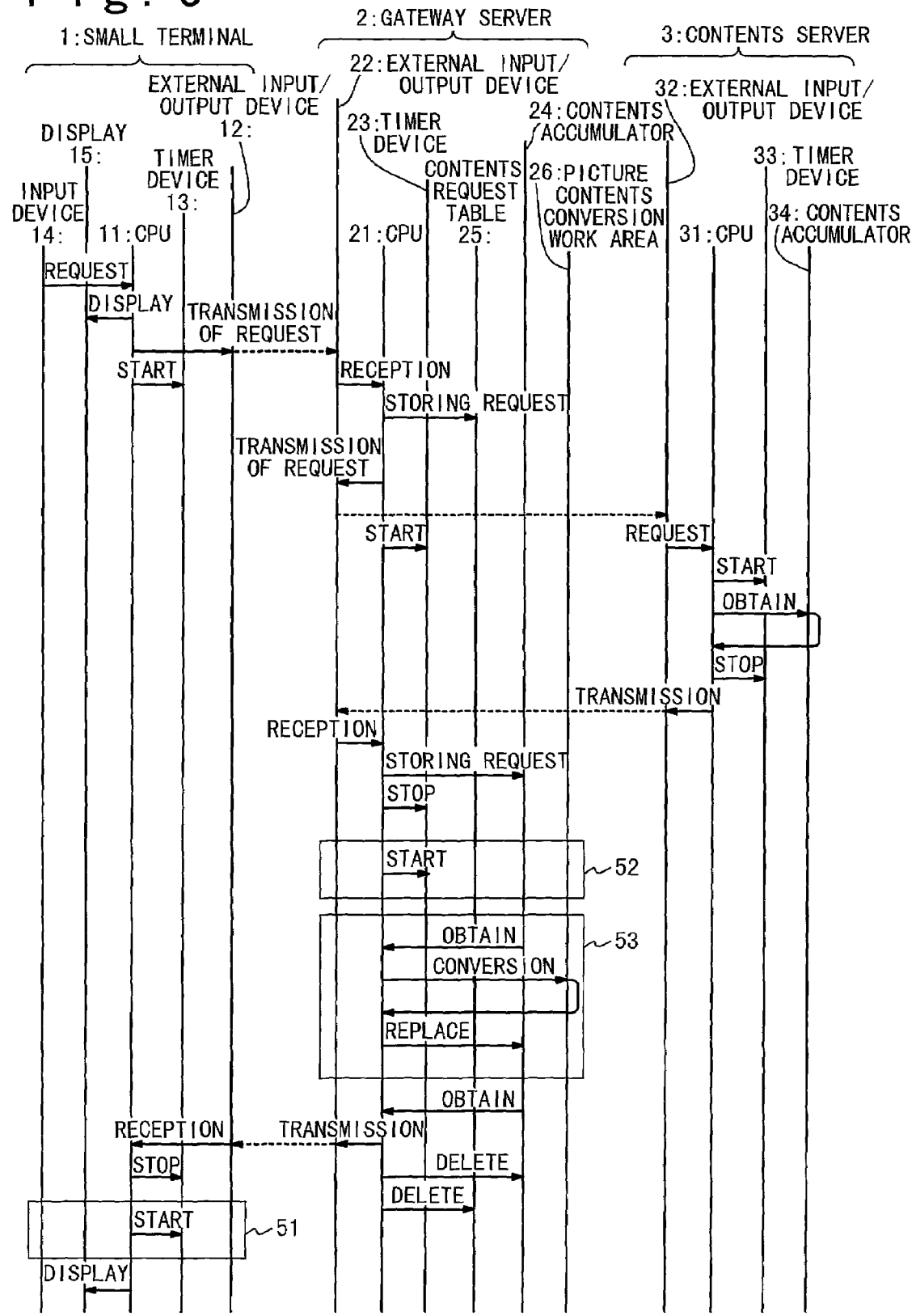
FIG. 5 is a time chart showing an embodiment of a method of obtaining a contents according to the present invention.

In the operation of the small terminal 1, the input device 14 receives the request of the contents retrieval from the user, as shown in FIG. 5. It passes the received request of the contents retrieval to the CPU 11. The CPU 11 instructs the display 15 to display the request of the contents retrieval, and instructs the external input/output device 12 to transmit the request of the contents retrieval. The display 15 displays a message of the request of the contents retrieval in accordance with the instruction of the CPU 11. The external input/output device 12 transmits the request of the contents retrieval through the network infrastructure 4 to the gateway server 2 in accordance with the instruction of the CPU 11. After the external input/output device 12 transmits the request of the contents retrieval, the CPU 11 instructs the timer device 13 to start the timer. The timer device 13 starts the timer in accordance with the instruction of the CPU 11.

When the external input/output device 12 receives the contents requested by the small terminal 1 from the gateway server 2, the external input/output device 13 passes the received contents to the CPU 11. The CPU 11 receiving the contents instructs the timer device 13 to stop the timer. The timer device 13 stops the timer in accordance with the instruction of the CPU 11.

If the reception of the requested contents is completed, the CPU 11 instructs the display 15 to display the retrieved contents. The display 15 displays the contents in accordance with the instruction of the CPU 11.

If the reception of the requested contents is not completed (51), the CPU 11 again instructs the timer device 13 to start the timer. The timer device 13 starts the timer in accordance with the instruction of the CPU 11. After that, if the reception of the contents is completed, the CPU 11 instructs the timer device 13 to stop the timer, and instructs the display 15 to display the retrieved contents. The timer device 13 stops the timer in accordance with the instruction of the CPU 11. The display 15 displays the contents, in accordance with the instruction of the CPU 11.

Figure 6:
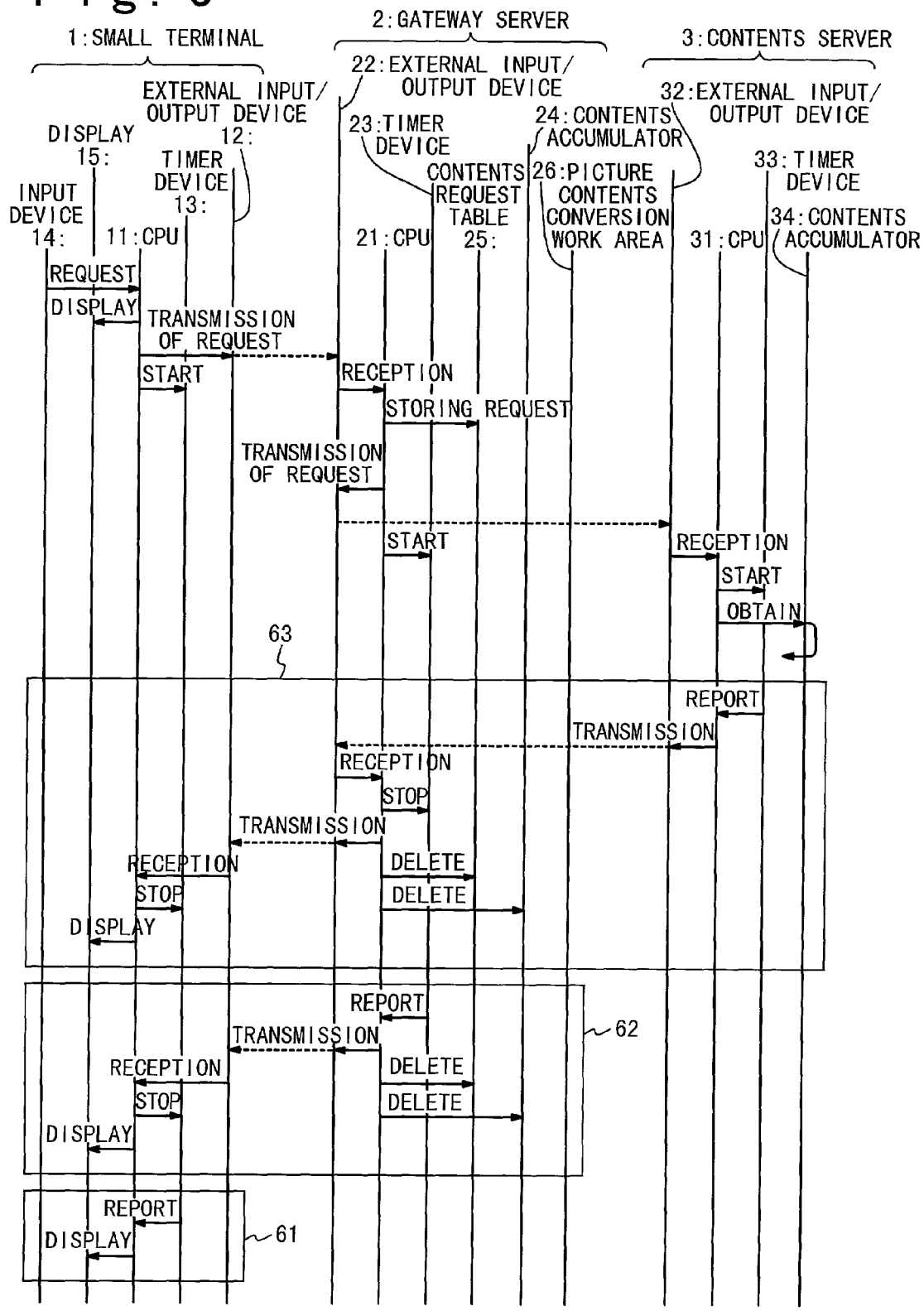
FIG. 6 is a time chart showing an embodiment of a method of obtaining a contents according to the present invention.

If the external input/output device 12 receives a message indicative of a failure in the contents retrieval from the gateway server 2, the external input/output device 12 passes this message to the CPU 11, as denoted by symbols 62, 63 of FIG. 6. The CPU 11 receiving this message instructs the timer device 13 to stop the timer, and instructs the display 15 to display the message indicative of the failure in the contents retrieval. The timer device 23 stops the timer in accordance with the instruction of the CPU 11. The display 15 displays the massage indicative of the failure in the contents retrieval, in accordance with the instruction of the CPU 11.

If the timer of the timer device 13 becomes at a time-out state, the timer device 13 reports the time-out to the CPU 11, as denoted by a symbol 61 of FIG. 6. The CPU 11 receiving the report of the time-out judges as the failure in the contents retrieval, and instructs the display 15 to display a message instructive of the failure in the contents retrieval. The display 15 displays the message of the failure in the contents retrieval in accordance with the instruction of the CPU 11.

In the operation of the gateway server 2, the external input/output device 22 receives a request of a contents retrieval from the small terminal 1, as shown in FIG. 5. It passes the received request of the contents retrieval to the CPU 21. The CPU 21 stores the request of the contents retrieval in the contents request table 25, and instructs the external input/output device 22 to transmit the request of the contents retrieval. The external input/output device 22 transmits the request of the contents retrieval to the contents server 3, in accordance with the instruction of the CPU 21. After the completion of the transmission of the request of the contents retrieval, the CPU 21 instructs the timer device 23 to start the timer. The timer device 23 starts the timer in accordance with the instruction of the CPU 21.

If the external input/output device 22 receives the requested contents from the contents server 3, the external input/output device 22 passes the received contents to the CPU 21. The CPU 21 receiving the contents stores the contents in the contents accumulator 24, and instructs the timer device 23 to stop the timer. The timer device 23 stops the timer in accordance with the instruction of the CPU 21. If the reception of the requested contents is completed, it is judged whether or not the received contents is a picture contents.

If the reception of the requested contents is not completed (52), the CPU 21 again instructs the timer device 23 to start the timer. The timer device 23 starts the timer in accordance with the instruction of the CPU 21. After that, if the reception of the contents is completed, the CPU 21 judges whether or not the received contents is the picture contents, and instructs the timer device 13 to stop the timer. The timer device 23 stops the timer in accordance with the instruction of the CPU 21.

If it is judged that the received contents is the picture contents (53), the CPU 21 retrieves the contents from the contents accumulator 24. It uses the picture contents conversion work area 26, and converts the retrieved contents into the contents satisfying the data with regard to the number of display pixels and the number of display colors initially owned by the CPU 21. It replaces the contents stored in the contents accumulator 24 with the converted contents.

If it is judged that the received contents is not the picture contents, or if the retrieved contents is already converted into the contents satisfying the number of display pixels and the number of display colors of the small terminal 1 since it is judged as the picture contents, the CPU 21 retrieves the contents from the contents accumulator 24, and instructs the external input/output device 22 to transmit the contents. The external input/output device 22 transmits the contents to the small terminal 1, in accordance with the instruction of the CPU 21. After the external input/output device 22 transmits the contents, the CPU 21 deletes the contents after the end of the transmission from the contents accumulator 24, and deletes the request of the contents retrieval transmitted by the contents request table 25.

If the external input/output device 22 receives a message indicative of a failure in the contents retrieval from the contents server 3, the external input/output device 23 passes this message to the CPU 21, as denoted by a symbol 63 of FIG. 6. The CPU 21 receiving this message instructs the timer device 23 to stop the timer, and instructs the external input/output device 22 to transmit the message indicative of the failure in the contents retrieval. The timer device 23 stops the timer in accordance with the instruction of the CPU 21. The external input/output device 22 transmits the message indicative of the failure in the contents retrieval to the small terminal 1 in accordance with the instruction of the CPU 21. After the transmission of the message, the CPU 21 deletes the request of the contents retrieval that can not be retrieved because of the failure in the retrieval from the contents request table 25. If there is any contents retrieved until the middle, it deletes its contents from the contents accumulator 24.

If the timer of the timer device 23 becomes at a time-out state (62), the timer device 23 reports the time-out to the CPU 21. The CPU 21 receiving the report of the time-out instructs the external input/output device 22 to transmit the message indicative of the failure in the contents retrieval. The external input/output device 22 transmits the message indicative of the failure in the contents retrieval to the small terminal 1 in accordance with the instruction of the CPU 21. After the transmission of the message, it deletes the request of the contents retrieval that can not be retrieved because of the failure in the obtainment from the contents request table 25. If there is any contents retrieved until the middle, it deletes its contents from the contents accumulator 24.

In the operation of the contents server 3, the external input/output device 32 receives a request of a contents retrieval from the gateway server 2, as shown in FIG. 5. It passes the received request of the contents retrieval to the CPU 31. The CPU 31, after receiving the request of the contents retrieval, instructs the timer device 33 to start the timer. The timer device 33 starts the timer in accordance with the instruction of the CPU 31. The CPU 31 analyzes the received request of the contents retrieval, checks a position of the contents, and retrieves the contents stored in the contents accumulator 34. After retrieving the contents, the CPU 31 instructs the timer device 33 to stop the timer and instructs the external input/output device 32 to transmit the retrieved contents. The timer device 33 stops the timer in accordance with the instruction of the CPU 31. The external input/output device 32 transmits the retrieved contents to the gateway server 2 in accordance with the instruction of the CPU 31.

If the timer of the timer device 33 becomes at the time-out state, the timer device 33 reports the time-out to the CPU 31, as denoted by the symbol 63 of FIG. 6. The CPU 31 receiving the report of the time-out instructs the external input/output device 32 to transmit the message indicative of the failure in the contents retrieval. The external input/output device 32 transmits the message indicative of the failure in the contents retrieval to the gateway server 2 in accordance with the instruction of the CPU 31.

The gateway server 2 according to the present invention converts the picture contents to be relayed so that it satisfies the display performance of the small terminal 1, and then distributes it. It is enough that the small terminal 1 can display the picture contents and contain the minimum display performance. It is not necessary that the contents generator is conscious of the small terminal 1 and the terminals except the small terminal and individually generates the picture contents. Even in a case of an occurrence of a new type picture contents, it can be displayed on the small terminal 1 by only the correspondence in the gateway server 2. As for the small terminal having the different display performance, the picture contents can be displayed further comfortably by installing the gateway server for each display performance. Thus, this is desirable.

The CPU 21 initially has the data with regard to the numbers of display pixels and the numbers of display colors of small terminals (not shown) having display performances respectively different from the display performance of the small terminal 1, in addition to them of the small terminal 1. Then, it converts a retrieved picture contents into a contents that can be displayed on one of the small terminals requesting the picture contents in accordance with a portion corresponding to the one of the small terminals requesting the picture contents of the data.

In another embodiment of the gateway server according to the present invention, the gateway server arbitrates a communication between a small terminal and a contents server, and further arbitrates even a communication between a terminal except the small terminal and the contents server. The configuration of the gateway server 2 is similar to that of another embodiment.

In the operation of the small terminal 1, the input device 14 receives the request of the contents retrieval from the user, as shown in FIG. 5. It passes the received request of the contents retrieval to the CPU 11. The CPU 11 instructs the display 15 to display the request of the contents retrieval, and instructs the external input/output device 12 to transmit the request of the contents retrieval and an information indicating that a self-terminal is a small terminal. The display 15 displays a message indicative of the request of the contents retrieval in accordance with the instruction of the CPU 11. The external input/output device 12 transmits the request of the contents retrieval and the information indicating that the self-terminal is the small terminal, through the network infrastructure 4 to the gateway server 2 in accordance with the instruction of the CPU 11. After the external input/output device 12 transmits the request of the contents retrieval, the CPU 11 instructs the timer device 13 to start the timer. The timer device 13 starts the timer in accordance with the instruction of the CPU 11.

If the external input/output device 12 receives the contents requested by the small terminal 1 from the gateway server 2, the external input/output device 12 passes the received contents to the CPU 11. The CPU 11 receiving the contents instructs the timer device 13 to stop the timer. The timer device 13 stops the timer in accordance with the instruction of the CPU 11.

If the reception of the requested contents is completed, CPU 11 instructs the display 15 to display the retrieved contents. The display 15 displays the contents in accordance with the instruction of the CPU 11.

If the reception of the requested contents is not completed (51), it again instructs the timer device 13 to start the timer. The timer device 13 starts the timer in accordance with the instruction of the CPU 11. After that, if the reception of the contents is completed, the CPU 11 instructs the timer device 13 to stop the timer, and instructs the display 15 to display the retrieved contents. The timer device 13 stops the timer in accordance with the instruction of the CPU 11. The display 15 displays the contents in accordance with the instruction of the CPU 11.

If the external input/output device 12 receives the message indicative of the failure in the contents retrieval from the gateway server 2, the external input/output device 12 passes this message to the CPU 11, as denoted by the symbols 62, 63 of FIG. 6. The CPU 11 receiving this message instructs the timer device 13 to stop the timer, and instructs the display 15 to display the message indicative of the failure in the contents retrieval. The timer device 23 stops the timer in accordance with the instruction of the CPU 21. The display 15 displays the massage indicative of the failure in the contents retrieval, in accordance with the instruction of the CPU 11.

If the timer of the timer device 13 becomes at the time-out state (61), the timer device 13 reports the time-out to the CPU 11. The CPU 11 receiving the report of the time-out judges as the failure in the contents retrieval, and instructs the display 15 to display the message instructive of the failure in the contents retrieval. The display displays the message of the failure in the contents retrieval in accordance with the instruction of the CPU 11.

In the operation of the gateway server 2, the external input/output device 22 receives the request of the contents retrieval from the small terminal 1, as shown in FIG. 5. It passes the received request of the contents retrieval to the CPU 21. The CPU 21 stores the request of the contents retrieval in the contents request table 25, and instructs the external input/output device 22 to transmit the request of the contents retrieval. If a terminal information is added to the request of the contents retrieval, this terminal information is also stored in the contents request table 25. The external input/output device 22 transmits the request of the contents retrieval to the contents server 3 in accordance with the instruction of the CPU 21. After the completion of the transmission of the request of the contents retrieval, the CPU 21 instructs the timer device 23 to start the timer. The timer device 23 starts the timer in accordance with the instruction of the CPU 21.

If the external input/output device 22 receives the requested contents from the contents server 3, the external input/output device 22 passes the received contents to the CPU 21. The CPU 21 receiving the contents stores the contents in the contents accumulator 24, and instructs the timer device 23 to stop the timer. The timer device 23 stops the timer in accordance with the instruction of the CPU 21. If the reception of the requested contents is completed, the CPU 21 judges whether or not the received contents is the picture contents. Moreover, it judges whether or not the terminal requesting this contents is the small terminal, in accordance with the terminal information stored in the contents request table 25.

If the reception of the requested contents is not completed (52), the CPU 21 again instructs the timer device 23 to start the timer. The timer device 23 starts the timer in accordance with the instruction of the CPU 21. After that, if the reception of the contents is completed, the CPU 21 judges whether or not the received contents is the picture contents, and instructs the timer device 13 to stop the timer. The timer device 23 stops the timer in accordance with the instruction of the CPU 21.

If it is judged that the received contents is the picture contents and also the terminal requesting this contents is the small terminal (53), and if it is judged that the received contents is the picture contents (53), the CPU 21 retrieves the contents from the contents accumulator 24. It uses the picture contents conversion work area 26, and converts the retrieved contents into the contents satisfying the data with regard to the number of display pixels and the number of display colors initially owned by the CPU 21. It replaces the contents stored in the contents accumulator 24 with the converted contents.

If it is judged that the received contents is not the picture contents, or if it is judged that the terminal requesting this contents is not the small terminal, or if the retrieved contents is already converted into the contents satisfying the number of display pixels of the small terminal 1 and the number of display colors since it is judged as the picture contents, the CPU 21 retrieves the contents from the contents accumulator 24, and instructs the external input/output device 22 to transmit the contents. The external input/output device 22 transmits the contents to the small terminal 1, in accordance with the instruction of the CPU 21. After the external input/output device 22 transmits the contents, the CPU 21 deletes the contents after the end of the transmission from the contents accumulator 24, and deletes the request of the contents retrieval transmitted by the contents request table 25.

If the external input/output device 22 receives the message indicative of the failure in the contents retrieval from the contents server 3 (63), the external input/output device 23 passes this message to the CPU 21, as shown in FIG. 6. The CPU 21 receiving this message instructs the timer device 23 to stop the timer, and instructs the external input/output device 22 to transmit the message indicative of the failure in the contents retrieval. The timer device 23 stops the timer in accordance with the instruction of the CPU 21. The external input/output device 22 transmits the message indicative of the failure in the contents retrieval to the small terminal 1, in accordance with the instruction of the CPU 21. After the transmission of the message, the CPU 21 deletes the request of the contents retrieval that can not be retrieved because of the failure in the obtainment from the contents request table 25. If there is any contents retrieved until the middle, it deletes its contents from the contents accumulator 24.

If the timer of the timer device 23 becomes at the time-out state (62), the timer device 23 reports the time-out to the CPU 21. The CPU 21 receiving the report of the time-out instructs the external input/output device 22 to transmit the message indicative of the failure in the contents retrieval. The external input/output device 22 transmits the message indicative of the failure in the contents retrieval to the small terminal 1, in accordance with the instruction of the CPU 21. After the transmission of the message, it deletes the request of the contents retrieval that can not be retrieved because of the failure in the obtainment from the contents request table 25. If there is any contents retrieved until the middle, it deletes its contents from the contents accumulator 24.

In the operation of the contents server 3, the external input/output device 32 receives the request of the contents retrieval from the gateway server 2, as shown in FIG. 5. It passes the received request of the contents retrieval to the CPU 31. The CPU 31, after receiving the request of the contents retrieval, instructs the timer device 33 to start the timer. The timer device 33 starts the timer in accordance with the instruction of the CPU 31. The CPU 31 analyzes the received request of the contents retrieval, checks the position of the contents, and retrieves the contents stored in the contents accumulator 34. After retrieving the contents, the CPU 31 instructs the timer device 33 to stop the timer, and instructs the external input/output device 32 to transmit the retrieved contents. The timer device 33 stops the timer in accordance with the instruction of the CPU 31. The external input/output device 32 transmits the retrieved contents to the gateway server 2 in accordance with the instruction of the CPU 31.

If the timer of the timer device 33 becomes at the time-out state (63), the timer device 33 reports the time-out to the CPU 31, as shown in FIG. 6. The CPU 31 receiving the report of the time-out instructs the external input/output device 32 to transmit the message indicative of the failure in the contents retrieval. The external input/output device 32 transmits the message indicative of the failure in the contents retrieval to the gateway server 2, in accordance with the instruction of the CPU 31.

Accordingly, it is not necessary to prepare the two gateway servers 2 for the small terminal 1 and the terminal except the small terminal.

In the gateway server according to the present invention, it is possible to display the picture contents in the small terminal, and its processing speed is further fast, and its manufacturing cost is cheap.

What is claimed is:

1. A plurality of gateway servers, each comprising:
   a convert section converting first contents into second contents, wherein said first contents is received from a contents server in response to a request of a small terminal that is broadcast by the contents server to the plurality of gateway servers and said second contents corresponds to a one of a plurality of possible display performances of a display section of said small terminal; and
   wherein the convert section judges whether said first contents are picture contents, and when said first contents are not picture contents, the convert section does not convert said first contents into said second contents and in that case said gateway server provides said first contents to said small terminal in an unconverted format; and
   an output section outputting said second contents to said small terminal,
   wherein said display performance corresponds to the number of display pixels of said display section of said small terminal so that an image corresponding to the picture contents is sized according to a size of the display section of said small terminal,
   wherein said display performance corresponds to the number of display colors of said display section, and
   wherein, based on the request of the small terminal as received by each of the plurality of gateway servers, a particular one of the plurality of gateway servers acts on the request based on the one of the plurality of possible display performances of the display section of said small terminal that is included as information in the request of the small terminal.

2. The gateway servers according to claim 1, wherein said small terminal is one of a portable wireless telephone, a personal handyphone system (PHS) terminal and a personal digital assistant.

3. The gateway servers according to claim 1, wherein said second contents can be displayed in said display section.

4. The gateway servers according to claim 1, wherein said convert section does not convert said first contents into said second contents, when said first contents is received from said contents server in response to a request of a non-small terminal other than said small terminal, and wherein said output section outputs said first contents to said non-small terminal.

5. The gateway servers according to claim 1, wherein when said first contents are received from the content server in response to a request from a non-small terminal, the convert section does not convert said first contents into said second contents, and the output section outputs the first contents to the non-small terminal.

6. A contents obtaining system, comprising:
a terminal having a display section to display contents;
a contents server storing contents; and
a plurality of gateway servers, and
wherein said terminal outputs a first request for obtaining required contents that is broadcast to said plurality of gateway servers, and
wherein one of said gateway servers outputs a second request for obtaining said required contents to said contents server in response to said first request, and
wherein said contents server outputs said required contents to said one of said gateway servers in response to said second request, and
when said required contents are picture contents, said one of said gateway servers converts said required contents into specific contents, wherein said specific contents correspond to a particular display performance of said display section of said terminal that is included as information in said first request, and
wherein said one of said gateway servers outputs said specific contents to said terminal,
wherein said one of said gateway servers judges whether said required contents are picture contents, and
wherein when said required contents is not said picture contents, said one of said gateway servers does not convert said required contents into said specific contents and also does not convert said required contents in any manner, and said one of said gateway servers outputs said required contents instead of said specific contents to said terminal, and
wherein said display performance corresponds to the number of display pixels of said display section of said small terminal so that an image corresponding to the picture contents is sized according to a size of the display section of said small terminal,
wherein the image corresponding to the picture contents is converted in size to fit the size of the display section of said small terminal and is sent to said small terminal as an undivided image, and
wherein, when said required contents are picture contents, another of said gateway servers converts said required contents into said specific contents, wherein said specific contents correspond to another display performance of said display section of said terminal that is different from said particular display performance and that is included as information in said first request.

7. The contents obtaining system according to claim 6, wherein said terminal is one of a small terminal and a terminal other than a small terminal, and
wherein when said terminal is a small terminal, said terminal outputs said first request for obtaining said required contents to said plurality of gateway servers, said first request including information indicating that said terminal is a small terminal, and
wherein when said plurality of gateway servers do not receive said information, none of said plurality of gateway servers converts said required contents into said specific contents, and
wherein, when said terminal is the small terminal, said one of said gateway servers converts said required contents into first specific contents,
wherein, when said terminal is the terminal other than the small terminal, said one of said gateway servers converts said required contents into second specific contents different from said first specific contents.

8. The contents obtaining system according to claim 6, wherein said small terminal is a portable wireless telephone, a personal handyphone system (PHS) terminal, or a personal digital assistant.

9. The contents obtaining system according to claim 7, wherein said first specific contents correspond to picture contents to suit a particular display of the small terminal, and wherein said second specific contents correspond to picture contents to suit a particular display of the terminal other than the small terminal.

10. A contents obtaining method, comprising:
(a) outputting a first request for obtaining contents from a terminal that is broadcast to a plurality of gateway servers;
(b) outputting a second request for obtaining said contents from one of said plurality of gateway server servers to a contents server in response to a said first request, said one of said plurality of gateway servers outputting the second request based on a particular display performance information of said terminal that is included in said first request, said terminal being capable displaying information in any one a plurality of different display performances;
(c) outputting said contents from said contents server to said one of said plurality of gateway servers in response to said second request;
(d) converting said contents into specific contents in said one of said plurality of gateway servers, wherein said specific contents corresponds to display performance of a display section of said terminal; and
(e) outputting said specific contents to said terminal from said one of said plurality of gateway servers; and
(f) determining whether said contents are picture contents, wherein when the contents are not determined as picture contents in step (f), step (d) is not performed and step (e) includes outputting said contents, instead of said specific contents, in an unconverted format, to said terminal from the said one of said plurality of gateway servers; and
(g) wherein, when the contents are determined as picture contents, displaying said picture contents on the display section of said terminal based on the display performance that includes the number of display pixels of said display section of said small terminal and color/non-color information of said display section of said small terminal, so that an image corresponding to the picture contents is sized according to a size of the display section of said small terminal,
wherein the image corresponding to the picture contents is converted in size to fit the size of the display section of said small terminal and is sent to said small terminal as an undivided image.

11. The contents obtaining method according to claim 10, wherein said terminal is one of a small terminal and a terminal other than a small terminal, and
wherein when said terminal a small terminal, step (a) includes outputting said first request of obtaining said contents to said plurality of gateway servers from said terminal, said first request including information indicating that said terminal is a small terminal, and
wherein step (d) is not performed when said plurality of gateway servers do not receive said information.

* * * * *